US012112129B2

(12) United States Patent
Garcia Santa et al.

(10) Patent No.: US 12,112,129 B2
(45) Date of Patent: Oct. 8, 2024

(54) METHOD AND APPARATUS FOR DECENTRALIZED SUPERVISED LEARNING IN NLP APPLICATIONS

(71) Applicant: Fujitsu Limited, Kawasaki (JP)

(72) Inventors: Nuria Garcia Santa, Madrid (ES); Kendrick Cetina, Madrid (ES)

(73) Assignee: FUJITSU LIMITED, Kawasaki (JP)

( * ) Notice: Subject to any disclaimer, the term of this patent is extended or adjusted under 35 U.S.C. 154(b) by 339 days.

(21) Appl. No.: 17/527,167

(22) Filed: Nov. 16, 2021

(65) Prior Publication Data
US 2022/0180057 A1   Jun. 9, 2022

(30) Foreign Application Priority Data

Dec. 3, 2020   (EP) ...................................... 20383052

(51) Int. Cl.
| | |
|---|---|
| *G10L 15/16* | (2006.01) |
| *G06F 18/214* | (2023.01) |
| *G06F 40/169* | (2020.01) |
| *G06F 40/226* | (2020.01) |
| *G06N 3/04* | (2023.01) |
| *G10L 15/06* | (2013.01) |

(Continued)

(52) U.S. Cl.
CPC .......... *G06F 40/226* (2020.01); *G06F 18/214* (2023.01); *G06F 40/169* (2020.01);
(Continued)

(58) Field of Classification Search
None
See application file for complete search history.

(56) References Cited

U.S. PATENT DOCUMENTS 11,508,360 B2 *  11/2022  Peng ..................... G06F 40/284
2007/0088696 A1    4/2007  Katariya et al.
(Continued)

FOREIGN PATENT DOCUMENTS

| CN | 109284313 A | 1/2019 |
| CN | 109492753 A | 3/2019 |
| CN | 109885823 A | 6/2019 |

OTHER PUBLICATIONS

Geyer et al., "Differentially Private Federated Learning: A Client Level Perspective", arXiv:1712.07557v2, Mar. 2018, 7 pages. (Year : 2018).*

(Continued)

*Primary Examiner* — Richard Z Zhu
(74) *Attorney, Agent, or Firm* — XSENSUS LLP

(57) ABSTRACT

A method of training a neural network as a natural language processing, NLP, model, comprises: inputting annotated training data to first architecture portions of the neural network, the first architecture portions being executed respectively in a plurality of distributed client computing devices in communication with a server computing device, the training data being derived from text data private to the client computing device in which the first architecture portion is executed, the server computing device having no access to any of the private text data; deriving from the training data, using the first architecture portions, weight matrices of numeric weights which are decoupled from the private text data; concatenating the weight matrices, in a second architecture portion of the neural network executed in the server computing device, to obtain a single concatenated weight matrix; and training, on the second architecture portion, the NLP model using the concatenated weight matrix.

2 Claims, 9 Drawing Sheets

(51) Int. Cl.
  *G10L 15/07* (2013.01)
  *G10L 15/18* (2013.01)
  *G06F 40/279* (2020.01)
  *G06F 40/295* (2020.01)
  *G10L 15/183* (2013.01)

(52) U.S. Cl.
  CPC .............. *G06N 3/04* (2013.01); *G10L 15/063* (2013.01); *G10L 15/075* (2013.01); *G10L 15/16* (2013.01); *G10L 15/18* (2013.01); *G06F 40/279* (2020.01); *G06F 40/295* (2020.01); *G10L 2015/0635* (2013.01); *G10L 15/1822* (2013.01); *G10L 15/183* (2013.01)

(56) References Cited

U.S. PATENT DOCUMENTS

| | | | |
|---|---|---|---|
| 2017/0169358 A1 | 6/2017 | Choi et al. | |
| 2019/0213490 A1 | 7/2019 | White et al. | |
| 2019/0318240 A1* | 10/2019 | Kulkarni | G06N 3/08 |
| 2019/0332955 A1 | 10/2019 | Manamohan et al. | |
| 2019/0340534 A1* | 11/2019 | McMahan | G06N 7/01 |
| 2020/0005081 A1 | 1/2020 | Nah et al. | |
| 2020/0042875 A1* | 2/2020 | Shazeer | G06F 18/214 |
| 2020/0293887 A1* | 9/2020 | De Brouwer | G16H 50/20 |
| 2021/0042645 A1* | 2/2021 | Sharma | G06F 16/2379 |
| 2022/0417225 A1* | 12/2022 | Gharibi | G06Q 30/0623 |
| 2023/0297777 A1* | 9/2023 | Dimitriadis | G06F 40/284 |
| | | | 704/9 |

OTHER PUBLICATIONS

European Search Report mailed on May 17, 2021, received for EP Application 20383052.6, 6 pages.

Bernal, "Decentralizing Large-Scale Natural Language Processing With Federated Learning", Retrieved from the Internet:https://www.diva-portal.org/smash/get/diva2: 1455825/FULLTEXT81.pdf, Jul. 29, 2020, 84 pages.

* cited by examiner

| Sentence # | | Word | POS | Tag |
|---|---|---|---|---|
| 1048565 | Sentence: 47958 | impact | NN | O |
| 1048566 | Sentence: 47958 | . | . | O |
| 1048567 | Sentence: 47959 | Indian | JJ | B-gpe |
| 1048568 | Sentence: 47959 | forces | NNS | O |
| 1048569 | Sentence: 47959 | said | VBD | O |
| 1048570 | Sentence: 47959 | they | PRP | O |
| 1048571 | Sentence: 47959 | responded | VBD | O |
| 1048572 | Sentence: 47959 | to | TO | O |
| 1048573 | Sentence: 47959 | the | DT | O |
| 1048574 | Sentence: 47959 | attack | NN | O |

Figure 7

| Layer (type) | Output Shape | Param # | Connected to |
| --- | --- | --- | --- |
| input_1 (InputLayer) | (None, 100, 20) | 0 | |
| input_2 (InputLayer) | (None, 100, 20) | 0 | |
| time_distributed_1 (TimeDistributedLayer) | (None, 100, 20, 20) | 2360 | input_1[0][0] |
| time_distributed_3 (TimeDistributedLayer) | (None, 100, 20, 20) | 2360 | input_2[0][0] |
| time_distributed_2 (TimeDistributedLayer) | (None, 100, 40) | 9760 | time_distributed_1[0][0] |
| time_distributed_4 (TimeDistributedLayer) | (None, 100, 40) | 9760 | time_distributed_3[0][0] |
| concatenate_1 (Concatenate) | (None, 100, 80) | 0 | time_distributed_2[0][0]<br>time_distributed_4[0][0] |
| spatial_dropout1d_1 (SpatialDropoutLayer) | (None, 100, 80) | 0 | concatenate_1[0][0] |
| bidirectional_1 (Bidirectional) | (None, 100, 140) | 84560 | spatial_dropout1d_1[0][0] |
| output_client1 (TimeDistributedLayer) | (None, 100, 18) | 2538 | bidirectional_1[0][0] |
| output_client2 (TimeDistributedLayer) | (None, 100, 18) | 2538 | bidirectional_1[0][0] |

Total params: 113,876
Trainable params: 113,876
Non-trainable params: 0

Figure 8

METHOD AND APPARATUS FOR DECENTRALIZED SUPERVISED LEARNING IN NLP APPLICATIONS

CROSS-REFERENCE TO RELATED APPLICATION

This application is based upon and claims the benefit of priority of the prior European Patent Application No. 20383052.6, filed on Dec. 3, 2020, the entire contents of which are incorporated herein by reference.

Embodiments relate to a method and apparatus for decentralized supervised learning in NLP applications.

Text Mining is a computer-implemented process using natural language processing (NLP) to derive high-quality information from text, e.g. examining large collections of written resources in order to generate new information. In order to discover relevant information, NLP techniques are used to transform text into data that can be used for further analysis. In addition to Text Mining, NLP techniques include Named Entity Recognition, Relations Extraction, Text Categorization and Topics Extraction.

In order to perform supervised learning of a neural network to train it as an NLP model it is necessary to have access to a large quantity of labelled training data, ideally datasets from a number of different sources. Labelled data however are often difficult, expensive, or time consuming to obtain, as they require the efforts of experienced human annotators.

It may be desirable for institutions which are to use the trained model to provide information from their databases for use as labelled training data in supervised learning. However, ensuring the privacy, security and confidentiality of data is nowadays essential in most enterprises. Many critical infrastructures in banking, healthcare, insurance, etc. require architectures where the data, models and resources are protected from external individuals and organizations, and therefore the information is decoupled from external access, often by decentralizing components and modules such that typically no single node has complete system information.

Thus, it is desirable to preserve the privacy of data in client computing devices in decentralized environments, whilst allowing that data to be used for natural language processing in supervised learning problems.

An embodiment according to a first aspect may provide a method of training a neural network as a natural language processing, NLP, model, the method comprising: inputting respective sets of annotated training data to a plurality of first architecture portions of the neural network, which first architecture portions are executed in respective client computing devices of a plurality of distributed client computing devices in communication with a server computing device, wherein each set of training data is derived from a set of text data which is private to the client computing device in which the first architecture portion is executed, the server computing device having no access to any of the private text data sets, and all sets of training data share a common encoding; deriving from the sets of annotated training data, using the first architecture portions, respective weight matrices of numeric weights which are decoupled from the private text data sets; concatenating, in a second architecture portion of the neural network which is executed in the server computing device, the weight matrices received from the client computing devices to obtain a single concatenated weight matrix; and training, on the second architecture portion, the NLP model using the concatenated weight matrix.

An embodiment according to a second aspect may provide apparatus for training a neural network as a natural language processing, NLP, model, the apparatus comprising: a plurality of distributed client computing devices to execute respectively a plurality of first architecture portions of the neural network, wherein each first architecture portion receives a set of annotated training data derived from a set of text data which is private to the client computing device in which the first architecture portion is executed, all sets of training data sharing a common encoding; and a server computing device in communication with each of the client computing devices of the plurality, the server computing device to execute a second architecture portion of the neural network, the server computing device having no access to any of the private text data sets; wherein: the first architecture portions derive, from the sets of annotated training data, respective weight matrices of numeric weights which are decoupled from the private text data sets, and the weight matrices received from the client computing devices are concatenated in the second architecture portion to obtain a single concatenated weight matrix, the NLP model being trained on the second architecture portion using the concatenated weight matrix.

Each client computing device may pre-process a private set of text data to derive a set of training data in the common encoding.

Pre-processing the private set of text data may comprise applying a codification to the text data which is common to all the client computing devices.

In the pre-processing the text data may be mapped to vectors of real numbers using mapping parameters which are common to all the client computing devices.

Pre-processing the private set of text data may comprise: carrying out on the set of text data in each client computing device a vocabulary codification process to ensure a common vocabulary codification amongst all the training data to be provided by the client computing devices, and using predefined common character-level representations and predefined common setting parameters, carrying out in each client computing device a word embedding process in which the text data is mapped to vectors of real numbers.

Embodiments provide a system architecture for applying decentralized learning over neural networks for dealing with different NLP tasks based on supervised learning strategies. In this way it is possible to maintain an independent and distributed way of utilizing data from client computing devices, whilst preserving privacy and confidentiality of sensitive information.

Global performance of the trained model may be improved thanks to being able to exploit data from different client devices during training, whilst complete protection of confidential information is provided through the proposed decentralized learning architecture in which each client's data is decoupled from the server, model and other clients. Costs, in terms of human resources, may also be reduced owing to a reduction in the amount of manual annotation needed to extend the input corpus.

The proposed method/system may be applied to any domain in the use case of Text Mining applications. Moreover, embodiments may be adapted to any kind of natural language processing techniques, such as Relations Extraction, Text Categorization, Topics Extraction, etc.

Reference will now be made, by way of example, to the accompanying drawings, in which:

FIG. 7 shows a snapshot of text from a dataset;

FIG. 8 shows the design of a neural network according to an embodiment; and

An embodiment will be described which solves the problem of generating a high-quality central model in supervised learning problems for NLP applications, for example Text Mining, whilst preserving confidentiality and privacy, since there is no need for data to be shared by clients with the server or other clients. Use of a decentralized architecture ensures that the data protection, privacy and confidentiality of the origin systems is maintained. That is, although the model is trained on data derived from information in origin systems, it is completely blind with respect to the information in the origin systems.

A decentralized learning architecture is proposed where neural network layers are decoupled between clients and a central server, providing a distributed learning system in which pre-processing of data and the first training layers are deployed in client computing devices (e.g. customers' servers). Subsequent learning steps are performed be in the server once access to the original data is not needed to continue with the learning process. Although not discussed below, it may also be possible to apply at the beginning an encryption algorithm to add an extra layer of security to the architecture and make stronger the anonymity and protection of data.

Figure 1:
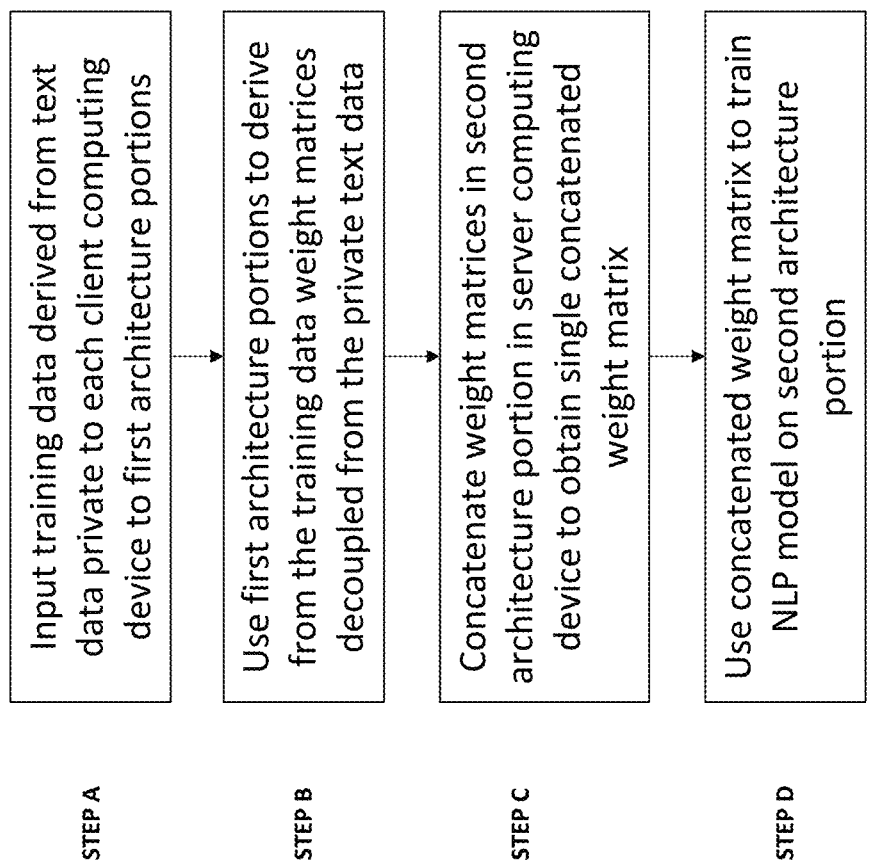
FIG. 1 is a flowchart of a method according to an embodiment.

The flowchart of FIG. 1 depicts a method of training a neural network as an NLP model, according to an embodiment. In this embodiment the method comprises, at step A, inputting respective sets of annotated training data to a plurality of first architecture portions A1 of the neural network, which first architecture portions A1 are executed only in respective client computing devices 10 of a plurality of n distributed client computing devices 10 (Client 1, Client 2, . . . , Client n) in communication with a server computing device 20. Each set of training data is derived from a set of text data which is private to the client computing device 10 in which the first architecture portion A1 is executed, i.e. the server computing device 20 has no access to any of the private text data sets. All sets of training data share a common encoding. The method further comprises, at step B, using the first architecture portions A1 to derive from the sets of annotated training data respective weight matrices of numeric weights which are decoupled from the private text data sets. The method then comprises, at step C, concatenating, in a second architecture portion A2 of the neural network which is executed only in the server computing device 20, the weight matrices received from the client computing devices 10 to obtain a single concatenated weight matrix, and, at step D, using the concatenated weight matrix to train the NLP model on the second architecture portion A2.

Figure 2:
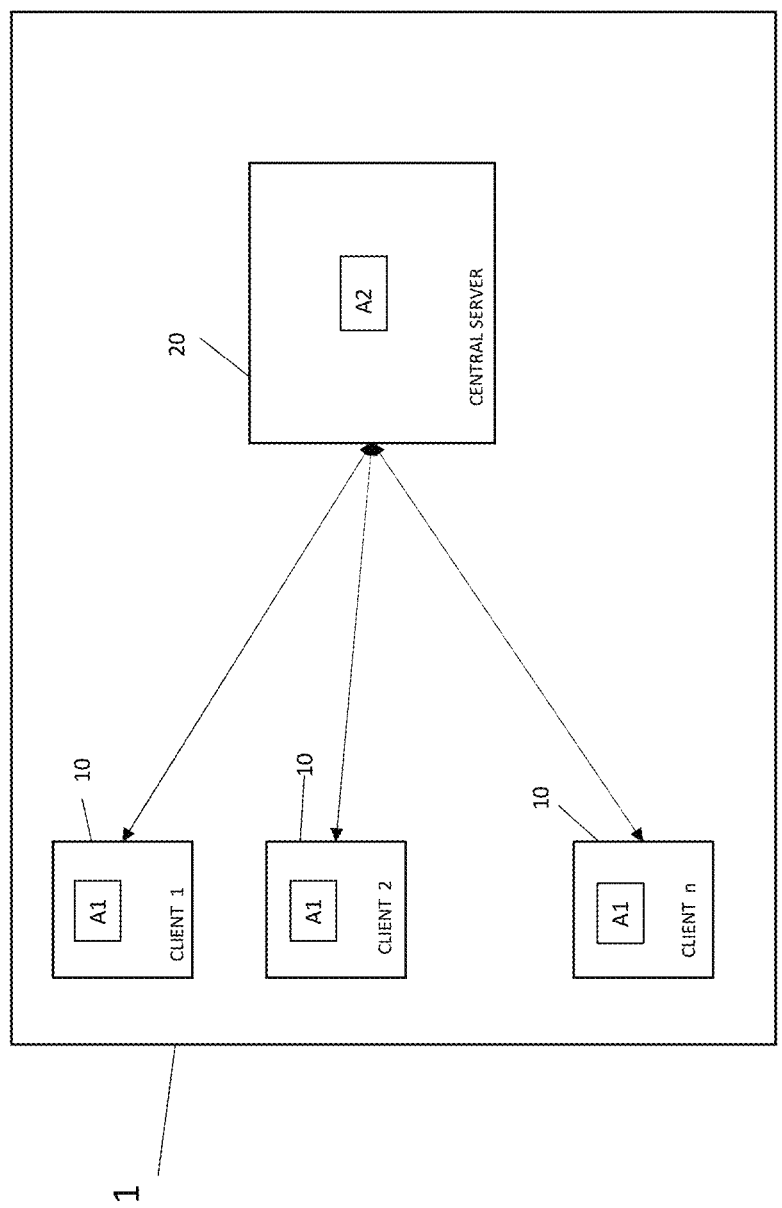
FIG. 2 shows apparatus in accordance with the embodiment.

The system shown in FIG. 2 depicts apparatus for training a neural network as an NLP model according to the embodiment of FIG. 1. In this embodiment the apparatus comprises a plurality of n distributed client computing devices 10 (Client 1, Client 2, . . . , Client n), hereafter sometimes referred to as "clients", and a server computing device 20, hereafter sometimes referred to as server or central server, in communication with each of the client computing devices 10 of the plurality. The client computing devices 10 are configured to execute respectively a plurality of first architecture portions A1 of the neural network, wherein each first architecture portion A1 receives a set of annotated training data derived from a set of text data which is private to the client computing device 10 in which the first architecture portion A1 is executed, all sets of training data sharing a common encoding. The server computing device 20 is configured to execute a second architecture portion A2 of the neural network, the server computing device 20 having no access to any of the private text data sets. The first architecture portions A1 derive, from the sets of annotated training data, respective weight matrices of numeric weights which are decoupled from the private text data sets, and the weight matrices received from the client computing devices 10 are concatenated in the second architecture portion A2 to obtain a single concatenated weight matrix, the NLP model being trained on the second architecture portion A2 using the concatenated weight matrix.

An embodiment applied to the training of an NLP model such as a Text Mining model will now be described in more detail.

Figure 3:
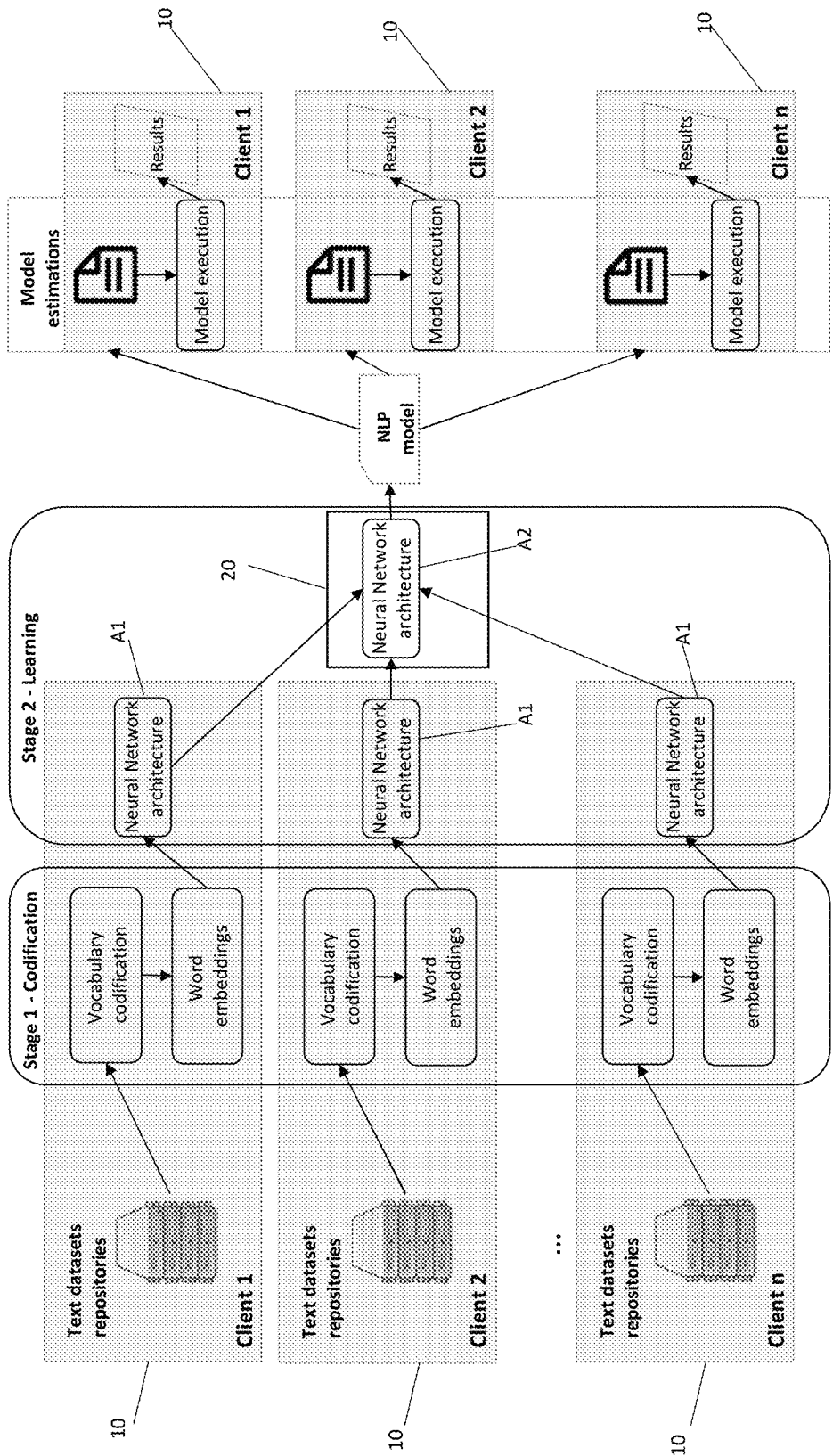
FIG. 3 depicts system architecture according to an embodiment.

FIG. 3 depicts system architecture according to an embodiment and two stages of training an NLP model. This architecture depicts an overall system with n clients 10, Client 1, Client 2, . . . Client n, each client having analogous stages and modules for carrying out a first "codification" stage (Stage 1) and part of a second "learning" stage (Stage 2) of the method, and a central server 20 which carries out the remaining part of the second stage in a common module. In stage 1—codification—a specific encoding of the input data is prepared to establish a common codification for all clients. In stage 2—learning—the neural network architecture is built and the mathematical operations to update the weights of the matrix in the learning process are carried out. In this way, a global and unique NLP model, such as a Text Mining model, may be created, leveraging information from different data sources in a decentralized way that increases the performance of the system while data preservation and confidentiality is ensured.

As shown at the lefthand side of FIG. 3, the initial input to the process will be datasets with text samples in natural language in each of the n clients. The output of the learning process is an NLP model, e.g. a Text Mining model, which may be used subsequently in each client to carry out estimations and classifications over new text samples, as shown on the righthand side of the Figure (Model estimations).

Stage 1—Codification

Stage 1 prepares a specific encoding of the input data to establish a common codification to be used by all of the n clients in order to be used in the training. Keeping a common vocabulary codification in training data allows a consistency in the learning process to be maintained during training.

This stage is executed in each client computing device and is composed of two components or modules, a vocabulary codification module and a word embeddings module.

Vocabulary Codification

Figure 4:
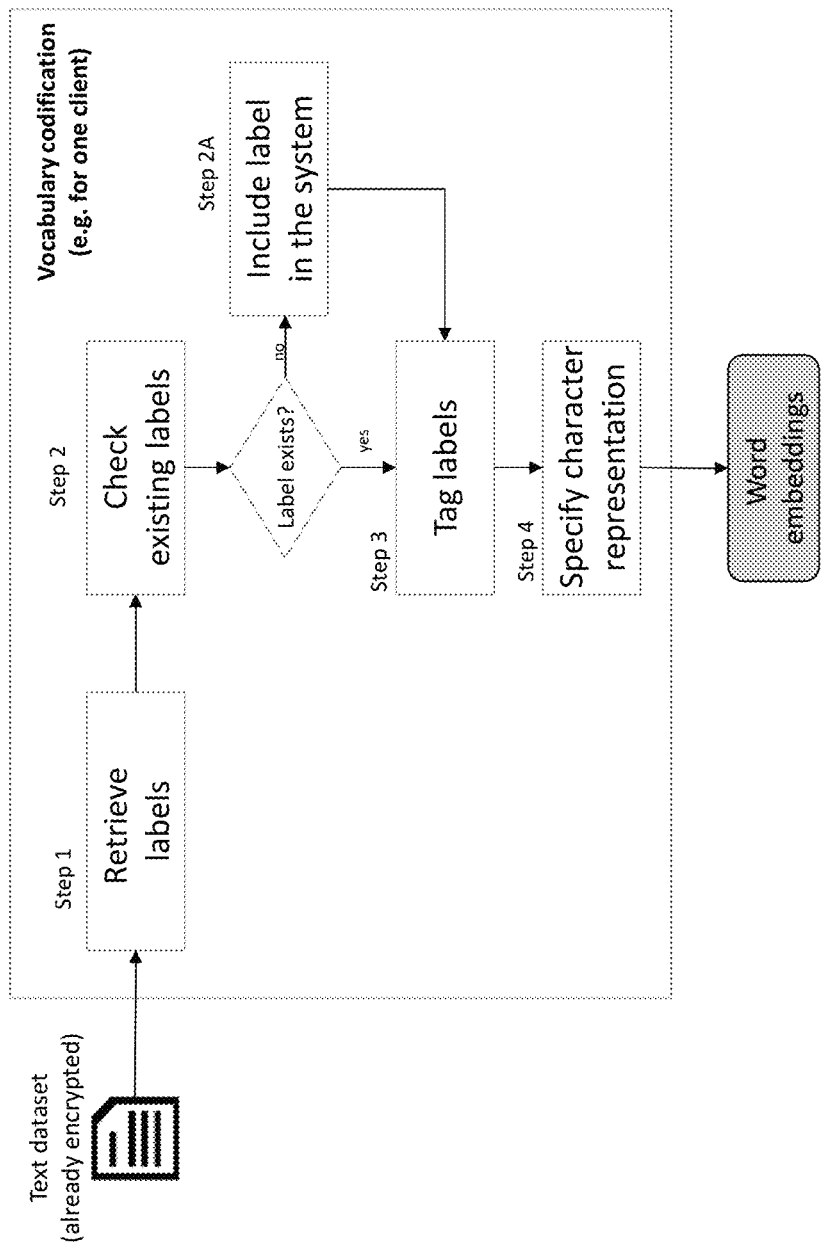
FIG. 4 shows a workflow of a vocabulary codification process.

The purpose of the vocabulary codification module is to ensure a common vocabulary codification among all clients involved. The input will be one or more text datasets from the client concerned. FIG. 4 shows a workflow of the vocabulary codification process for one client to facilitate its understanding. This module is essentially carried out within the client, other than for light communication with the central server which may be needed to share general (non-private) information.

Referring to FIG. 4, the vocabulary codification procedure comprises the following processes:
1. Retrieve labels: All the text datasets will already be annotated with labels. For instance, in Named Entity Recognition (NER) the labels reference to the type of entity (e.g. person, location, disease, organization, etc.) or in Text Classification labels reference to the type of content text (e.g. sports, finance, science, etc.). A sharing-label architecture is followed among clients, the labels being sufficiently general that they may be shared openly among clients without concerns of data leakage.

So, in step 1, each client analyzes its dataset(s) to extract all the distinct labels involved in the annotations, sending to the server its list of labels (i.e. there is client-server communication to share this information). Therefore, the server collects a list of labels from each client that will be the input for the next step.

2. Check existing labels: In step 2 the lists of labels from each client are compared against the information stored in a "labels dictionary" maintained by the server. If the labels in the list extracted by a client already exist in the labels dictionary, the process continues to the next step, step 3. If not, an additional step, step 2A, is carried out to include the new label in the labels dictionary. A unique central sharing list of labels is then provided, to maintain consistency in the next step where labels are tagged.

3. Tag labels: In step 3 the labels are tagged to a numeric representation from 1 to N (N=total number of labels) to ensure consistency among all clients. At this point, a vectorized labels representation (Vector of Labels), which is a parameter that will be used in the training, is obtained.

4. Specify character representation: In step 4 a common (alphanumeric) character-level representation is established for the vocabulary that will be followed subsequently. The central server decides the characters to be included in this representation (depending on the language of the datasets) and this character-level representation is sent to each client (i.e., there is server-client communication to share this information). Each client has to follow the specified character-level representation to keep a common encoding among all clients and maintain consistency in the following steps.

Word Embeddings

The word embeddings module prepares and encapsulates final word-level representation of the clients' datasets for later training. This process takes place on the clients' side following the setting of the character-level representation shared by central server in step 4 of the vocabulary codification procedure. For the exploitation of clients' datasets in the training process, a numeric representation of the text samples is needed. The method for converting text representation to numeric representation is the following:

Tag character-level representation: Taking the character-level representation (char-level) sent by the server, each character is mapped to a numeric representation from 1 to m (m=total number of characters).

Create character sequences: Firstly, the central server specifies two common setting parameters and sends this information to each client. These parameters are 'maximum_length_of_sentence' and 'maximum_length_of_word'. Both parameters need to be fixed and unique for all clients. Next, using the specified parameters, each client divides the samples by sentences and each sentence by tokens. Over each sentence, all its tokens are transformed to the numeric representation indicated by the server in the character-level representation. All words of each sentence will follow this character-level representation fixed to the two specified parameters. A word cannot be longer than the 'maximum_length_of_word' and a sentence cannot be longer than the 'maximum_length_of_sentence'. Any words and/or sentences shorter than the maximum length will be filled by zeros until the maximum length is reached. This is to keep the dimension size of the final generated matrix symmetric, as required for the training.

For instance, the embedding of each word having 'maximum_length_of_word'=20 in the sentence 'The global financial crisis has left Iceland's economy in shambles' will be:

The [47 9 6 0 0 0 0 0 0 0 0 0 0 0 0 0 0 0 0 0]
global [ 8 13 16 3 213 0 0 0 0 0 0 0 0 0 0 0 0 0 0 0]
financial [7 10 15 2 15 4 10 2 13 0 0 0 0 0 0 0 0 0 0 0]
crisis [4 19 10 20 10 20 0 0 0 0 0 0 0 0 0 0 0 0 0 0]
has [ 9 2 20 0 0 0 0 0 0 0 0 0 0 0 0 0 0 0 0 0]
left [13 6 7 21 0 0 0 0 0 0 0 0 0 0 0 0 0 0 0 0]
Iceland [36 4 6 13 2 15 5 0 0 0 0 0 0 0 0 0 0 0 0 0]
's [84 20 0 0 0 0 0 0 0 0 0 0 0 0 0 0 0 0 0 0]
economy [6 4 16 15 16 14 26 0 0 0 0 0 0 0 0 0 0 0 0 0]
in [10 15 0 0 0 0 0 0 0 0 0 0 0 0 0 0 0 0 0 0]
shambles [20 9 214 313 620 0 0 0 0 0 0 0 0 0 0 0 0 0 0 0]

The final output of the word embeddings module will be a 3-dimensional matrix (Word Embedding Matrix) which represents the sentences of the input samples by word following a character-level representation, e.g.

```
[
  [ [36 19 2 ... 0 0 0]
    [16 7 7 ... 0 0 0]
    [20 2 26 ... 0 0 0]
    ...
    [0 0 0 ... 0 0 0]
    [0 0 0 ... 0 0 0]
    [0 0 0 ... 0 0 0] ]
  ...
]
```

Thus, the output of Stage 1 will be the Word Embedding Matrix and the Vector of Labels obtained for each client. This output will be used as input to Stage 2.

In a NER use case, each label in the vector has a correspondence with each word in the matrix. For instance, in the previous example sentence, the vector of labels for that sentence in a NER use case is:

[12 12 12 12 12 12 10 12 12 12 12 12 0 0 . . . ]

where
12=O (Other)
10=B-Org (Beginning-Organization)—in this example corresponding to the country name "Iceland"

Stage 2—Learning

Stage 2 builds the neural network architecture and proceeds with the mathematical operations to update the weights of the matrix in the learning process. These weight values will be updated in each learning step by equations to approximate the estimate output with the real value (label annotation included). The estimated output will be compared with the real value to calculate the deviation and propagate the error backwards to previous layers in order to correct and adjust the weights.

The input to Stage 2 comes from Stage 1. As mentioned above, the input needed primarily is the Word Embedding Matrix and the associated Vector of Labels. In addition, other setting parameters will be required, such as 'maximum_length_of_sentence' and 'maximum_length_of_word', also used in the previous stage, or others needed in the configuration of the neural network, such as the number of neurons for each layer, dropout values, type of activation, optimizer or loss equation, etc.

Figure 5:
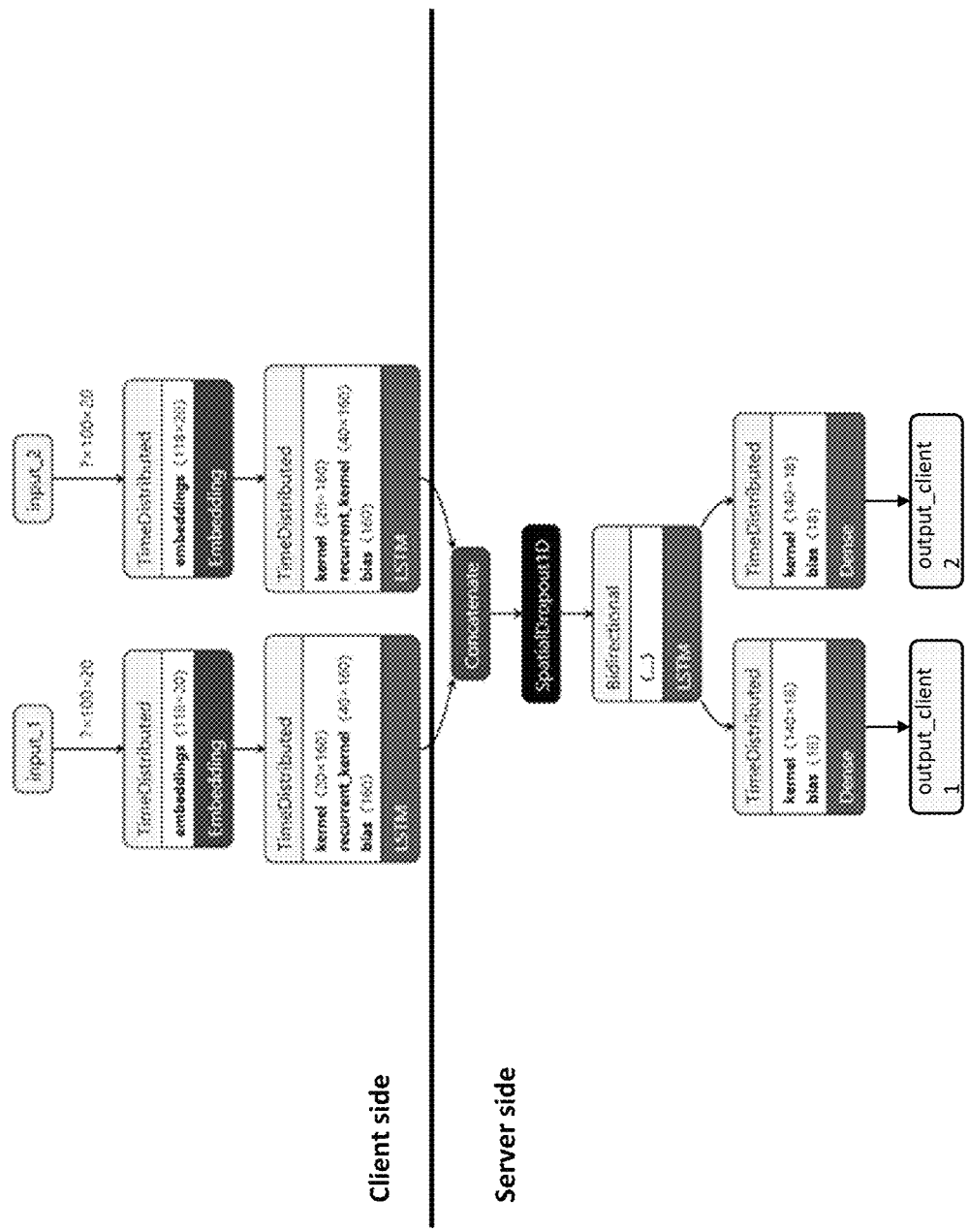
FIG. 5 shows an example of the learning architecture according to an embodiment.

FIG. 5 shows an example of the learning architecture of the neural network design where there are two clients, e.g. Client 1 and Client 2.

This architecture is composed of two parts, a first part that is run on the client side, and a second part that executes on the server.

In the first part for each client the components are:
- an Embedding layer [dimensions (num. of character in the vocab×maximum_length_of_word)=(118×20) in the above example], which is encapsulated in a TimeDistributed layer. The input is (?×100×20) references to the Word embedding Matrix transformed from the text datasets (number of samples×maximum_length_of_sentence×maximum_length_of_word). The purpose of the Embedding layer is to capture relationships between words by mapping words having similar meanings to similar numerical vector representations (word embeddings). The vector values are learned and updated as the neural network is trained. The TimeDistributed layer updates values in the matrices where it is applied during the training, applying the same operations to each appearance of a word in the texts (effectively treating each word as a time series), which results in better definition of a word's different meanings and disambiguates word relationships. The output of the Embedding layer is a matrix that represents numerically the relations between the words of the input samples. Each row of the output matrix is the vector values for each word in comparison with the rest of the words.
- a long short-term memory (LSTM) layer with several setting parameters encapsulated in a TimeDistributed layer. An LSTM layer includes a memory module to remember previous steps in the training process and decide if weight updates improve the results from the past or not, in order to decide whether to accept the updates or discard them. The matrices representing the input samples following the word embeddings from previous layers are input and updates are made based on the annotations of the input samples (if NER, entity annotations; if Relation Extraction, maybe binary classification '0' or '1'). The updates of the matrices will depend on these annotations and following characteristics of the LSTM layers. Again, the TimeDistributed layer treats the input samples like time series data, applying the same operations to each input.

When the process is executed, the weights updated by the LSTM layer will be shared with the server to continue the training of the NLP model with all the information from different clients. At this point the matrices shared only have numeric weights which are decoupled from the text in the origin datasets, and there is no way to reconstruct and obtain the origin text datasets, thereby ensuring privacy of the information.

Next, in the server side, the components of the architecture are:
- a concatenate layer (Merged layer) for the concatenation of weight matrices from the different clients. The weight matrices from the clients are joined sequentially, from client 1 to client n, into one matrix to start learning in a common way.
- a dropout layer over the concatenated matrix to avoid overfitting of the model during training.
- a bidirectional LSTM (BiLSTM) layer (a BiLSTM layer consists of two LSTM layers, one taking the input in a forward direction and the other in a backwards direction. A BiLSTM layer learns bidirectional long-term dependencies between steps of sequence data, effectively increasing the amount of information available to the network, and thereby improving the context available to the algorithm (e.g. knowing what words immediately follow and precede a word in a sentence)).
- a final Dense layer encapsulated in a TimeDistributed layer. The Dense layer is split into parts according to the number of clients, i.e. one part per client (in the example shown there are 2 parts because there are 2 clients). As each client builds embeddings with the same specifications, the shape of the input is the same for each client and, similarly, the shape of the output is the same for each client. The server creates layers with the correct shape and hence the BiLSTM layer outputs the corresponding shape. Further, since in the concatenate layer the weight matrices from different clients are concatenated in a sequential way, the output of the BiLSTM layer can be split appropriately for input into respective parts of the Dense layer. Thus, in this example the final output of the Dense layer is a trained model, but with two matrices (output_client1 and output_client2) corresponding to the final weight matrices that fit better for each respective client.

In addition, an intermediate communication channel must be provided in order to send the back-propagated error from the server to the client side to adjust the weights in the first layers, and similarly to share forward the weights updated from the client side to the server side.

In this example the final output is a unique Text Mining model, but depending on the required task it may be a NER model, a Text Classification model, a Topic Categorization model, etc.

Below, components for supporting activities of the whole system will be described.

Model Estimations

Figure 6:
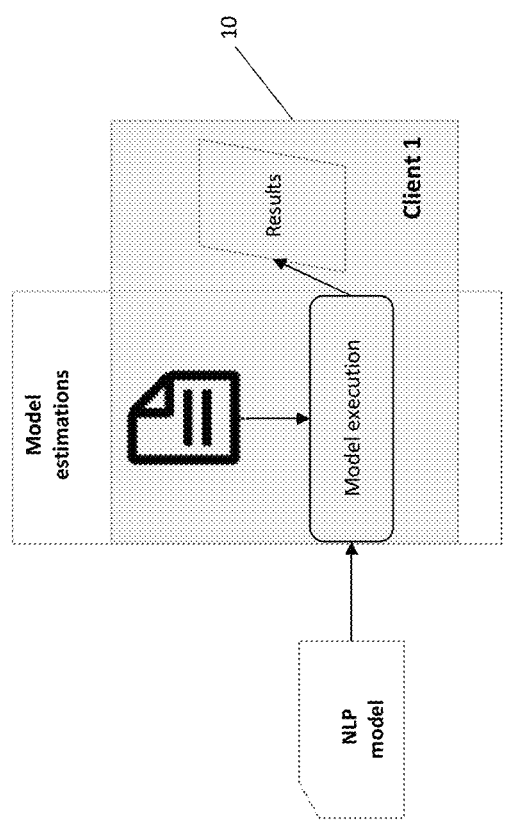
FIG. 6 shows architecture for a model estimations module.

Once the 'Text Mining Model' is created we can use this model to do new estimations, classifications or categorizations. FIG. 6 shows this part of the architecture for Model Estimations module in one client (Client 1).

The model estimations module has as input the 'Text Mining Model' and a new text paragraph. The 'Model execution' component receives these inputs and proceeds with the following steps:
1. Pre-processing of the new text paragraph to clean and curate the text: actions such as removing punctuation characters, normalization of words (singular forms, lemmatization, stemming, etc.) may be included, among other state-of-the-art approaches.
2. The new text is divided into sentences and each sentence is divided by tokens. Next, mapping and transformation of the sentences and tokens to the character vocabulary representation is carried out, as described in Stage 1. Therefore, at this point the Word Embedding matrix of the input text will be obtained.

3. The 'Text Mining Model' is run with the Word Embedding matrix of the new text as input of the model. This execution will output the prediction results for the new text. Depending on the text mining task the results will change. For instance, in a NER task the results will be an entity type label (e.g. person, organization, disease, location, etc.) for each word of the text; in Text Classification the result will be a theme for the whole text (e.g. sports, finance, health, etc.); in Topic Categorisation the results will be a list of topics for the text (e.g. [AI, NLP, machine learning], or [security, privacy, confidentiality], etc.).

Worked Example

The following worked example is based on an experiment done to simulate a decentralized NER model (DeNER) using datasets from two independent sources (i.e. two simulated clients). Known public datasets were exploited for the experiment, where the named entities annotated are general-domain such as location, person, organization or time among others.

The workflow of this worked example is the following:
Inputs:
Known public dataset of named entities annotations divided into two documents to simulate two independent clients. The entities annotated are:
geo=Geographical Entity
org=Organization
per=Person
gpe=Geopolitical Entity
tim=Time indicator
art=Artifact
eve=Event
nat=Natural Phenomenon
The format of the datasets follows the IOB nomenclature for tagging the tokens which is:
I: prefix before a tag indicates that the tag is inside a chunk.
B: prefix before a tag indicates that the tag is the beginning of a chunk.
O: this tag indicates that a token belongs to no chunk (outside).
A snapshot of the data is shown in FIG. 7.
There are 17 tags and they are shared between both datasets (=the two clients).
Procedure:
Stage 1—Codification:
1. Vocabulary Codification
To proceed with this step communication between the central server and each client must be established to request the list of labels. First, the server iteratively asks for the labels from client 1. Because in this example this is the first request to any of the clients, all labels of client 1 will be stored. For example, if client 1 has labels B-geo, I-geo, B-gpe, I-gpe, B-per, I-per, B-eve, I-eve and O in its list, all these labels will be included in the system of the central server within the 'labels dictionary' of the system. Next, the server asks client 2 for its labels. For example, if client 2 has labels B-geo, I-geo, B-nat, I-nat, B-per, I-per, B-tim, I-tim, B-art, I-art, B-org, I-org and O in its list, in the checking of the labels from client 2, B-geo, I-geo, B-per and I-per will be discarded because they were already provided by client 1. The remaining labels in Client 2's list will be added to the 'labels dictionary' of the central server, resulting in a unique central sharing list of labels.

After collecting the central sharing list of labels, this list is vectorized to transform it to a numeric representation as described above in order that the resulting the vectorized labels representation (Vector of Labels) may be used later by the neural network. In particular, the list of labels is enumerated from 1 to 17 (17=total number of labels) to obtain a representation like:

| B-geo | I-geo | B-gpe | I-gpe | B-tim | I-tim | B-org | I-org | B-per | I-per | B-art | I-art | B-nat | I-nat | B-eve | I-eve | O |
|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 |

Finally in this step, the common character-level representation of the vocabulary that all clients should follow is specified. For instance, the following alphanumeric character-level representation, that covers the whole alphabet of the dataset in this experiment, may be:
"abcdefghijklmnopqrstuvwxyzABCDEFGHIJKLM-NOPQRSTUVWXYZ0123456789.(+$*)-/,=
äëïöüÄËÏÖÜ'†94áéíóúÁÉÍÓÚ&?:_\x91\x92@\xa0\x96'~#†x85%\x93\x97!;[ ]\"°"
This character-level representation is sent to all clients and each client must follow this representation to keep a common encoding among all clients.
2. Word Embeddings
This module prepares and encapsulates final word-level representation of the clients' datasets for later training. This action will take place on the clients' side following the setting of the character-level representation shared by the central server in the previous step.
In each client, in the same way that was done for the label tags before, each character of the vocabulary is encoded following a numeric representation from 1 to 117 (117=total number of characters). And in position 0 an extra representation "UNK" is added to deal with potential new unknown characters or mistakes, so there will be a total of 118.
Next, the character sequences are created. In the central server the parameters of 'maximum_length_of_sentence=100' and 'maximum_length_of_word=20', are specified and sent to each client. Each client divides the samples by sentences and each sentence by tokens. Over each sentence, all its tokens are transformed to the numeric representation indicated by the server in the character-level representation. All words of each sentence will follow this character-level representation fixed to the two above-mentioned parameters.
For instance, the embedding of each word having 'maximum_length_of_word'=20 in the sentence 'The global financial crisis has left Iceland's economy in shambles' will be:
The [47 9 6 0 0 0 0 0 0 0 0 0 0 0 0 0 0 0 0 0]
global [ 8 13 16 3 213 0 0 0 0 0 0 0 0 0 0 0 0 0 0 0]
financial [7 10 15 2 15 4 10 2 13 0 0 0 0 0 0 0 0 0 0 0]

crisis [4 19 10 20 10 20 0 0 0 0 0 0 0 0 0 0 0 0 0]
has [ 9 2 20 0 0 0 0 0 0 0 0 0 0 0 0 0 0 0 0]
left [13 6 7 21 0 0 0 0 0 0 0 0 0 0 0 0 0 0 0]
Iceland [36 4 6 13 2 15 5 0 0 0 0 0 0 0 0 0 0 0 0]
's [84 20 0 0 0 0 0 0 0 0 0 0 0 0 0 0 0 0 0]
economy [6 4 16 15 16 14 26 0 0 0 0 0 0 0 0 0 0 0 0]
in [10 15 0 0 0 0 0 0 0 0 0 0 0 0 0 0 0 0 0]
shambles [20 9 214 313 620 0 0 0 0 0 0 0 0 0 0 0 0 0]

The final output of word embeddings will be a 3-dimensional matrix (Word Embedding Matrix) which represents the sentences of the input samples by word following a character-level representation.

[
 [ [36 19 2 ... 0 0 0]
   [16 7 7 ... 0 0 0]
   [20 2 26 ... 0 0 0]
   ...
   [0 0 0 ... 0 0 0]
   [0 0 0 ... 0 0 0]
   [0 0 0 ... 0 0 0] ]
 ...
]

This Word Embedding Matrix and the Vector of Labels will be the output of this stage for each client and will be used as input in the next steps. In this use case, each label in the vector has a correspondence with each word in the matrix. For instance, the vector of labels for the previous example sentence is:

[12 12 12 12 12 12 10 12 12 12 12 12 0 0 . . . ]

12=O (Other)

10=B-Org (Beginning-Organization)—in this example corresponding to the country name "Iceland"

Stage 2—Learning:

FIG. 5 depicts the specific setting values that were used for this experiment, that is:

dimensions (num. of character in the vocab×maximum_length_of_word)=(118×20) in the example, which is encapsulated in a TimeDistributed layer.

The input of (?×100×20) references to the Word embedding Matrix transformed from the text datasets (number of samples×maximum_length_of_sentence×maximum_length_of_word).

The number of samples will be 23979 in each client for this experiment.

The design of the neural network with the specific values for this experiment is as shown in FIG. 8.

Training was executed with an early stopping callback with the requirement of finishing the training if validation loss ('val_loss') was less than 0.0557. In this proposal 80 epochs were needed before reaching a 'val_loss' of 0.0554. The final snapshot of the process is:

Epoch 79/100
19422/19422
[==============================]—301 s 15 ms/step—loss: 0.0463—time_distributed_5_loss: 0.0234—time_distributed_6_loss: 0.0229—time_distributed_5_acc: 0.9924—time_distributed_6_acc: 0.9927—val_loss: 0.0566—val_time_distributed_5_loss: 0.0276—val_time_distributed_6_loss: 0.0291—val_time_distributed_5_acc: 0.9916—val_time_distributed_6_acc: 0.9910
Epoch 80/100
19392/19422 [=============================>.]—ETA: 0 s—loss: 0.0462—time_distributed_5_loss: 0.0235—time_distributed_6_loss: 0.0227—time_distributed_5_acc: 0.9924—time_distributed_6_acc: 0.9928Epoch 00079: early stopping THR
19422/19422
[==============================]—303 s 16 ms/step—loss: 0.0462—time_distributed_5_loss: 0.0235—time_distributed_6_loss: 0.0227—time_distributed_5_acc: 0.9924—time_distributed_6_acc: 0.9928—val_loss: 0.0554—val_time_distributed_5_loss: 0.0271—val_time_distributed_6_loss: 0.0284—val_time_distributed_5_acc: 0.9915—val_time_distributed_6_acc: 0.9913

[Target/Impact—Quantitative Improvement of Performance (F-Scores Increased)]

Evaluation: Comparison of Results

Training this NER use case as it is conventionally done, in a separate way for each client and building separate models for each one, the following f-scores were obtained:

| NER model of Client 1 [12e, val_loss = 0.0553] | | NER model of Client 2 [12e, val_loss = 0.0545] | |
| --- | --- | --- | --- |
| Client 1 | 63.9% | Client 2 | 65.8% |

However, training the NER using the proposed decentralized supervised learning approach (DeNER), the following f-scores were obtained:

| DeNER model (common model for all clients) [80 epochs, val_loss = 0.0554] | | | |
| --- | --- | --- | --- |
| Client 1 | 76.3% | Client 2 | 76.7% |

Thus, it may be seen that results obtained using the proposed DeNER model are better than the results of each dedicated model trained in each client by more than 10 points. The proposed DeNER model combines in one solution the named entities recognition from different clients, making it possible for one client to learn from the knowledge in another client without sharing any text data and preserving completely the privacy of sensitive information. Although the DeNER model needs more epochs for training to reach the specified validation loss, since it combines more information, the performance is much better than local models reaching the same validation loss.

Figure 9:
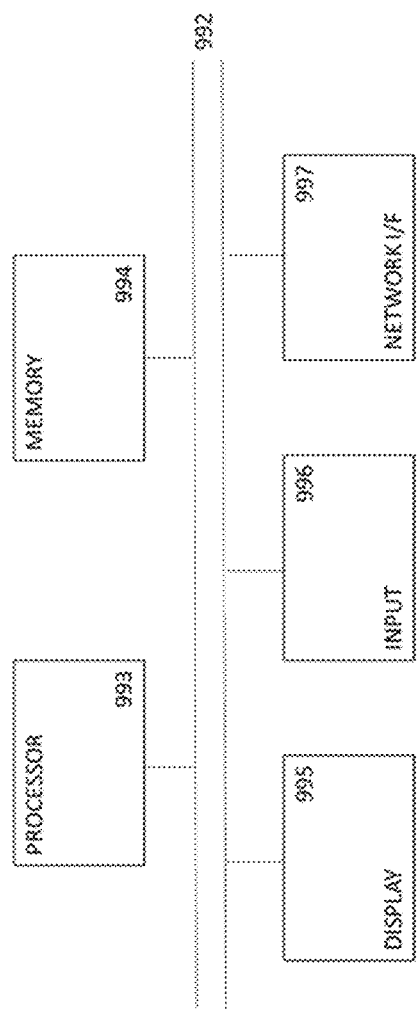
FIG. 9 is a block diagram of a computing device suitable for carrying out a method according to an embodiment.

FIG. 9 is a block diagram of a computing device, such as a data storage server, which embodies the present invention, and which may be used as a server computing device 20 or a client computing device 10 to implement some of the operations of a method embodying the present invention, and perform some of the tasks of apparatus of an embodiment. For example, the computing device of FIG. 9 may be used to implement all the tasks of the server computing device 20 shown in FIGS. 2 and 3 or all the tasks of one of the client computing devices 10 of FIGS. 2, 3 and 6, and perform one or more of the processes described with reference to FIGS. 1, 3, 4 and 5.

The computing device comprises a processor 993 and memory 994, which may for example be configured to perform the tasks of the first architecture portion A1 or the second architecture portion A2 of the neural network. The computing device also includes a network interface 997 for communication with other computing devices, for example at least with one other computing device of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon, such as the first architecture portion A1 or the second architecture portion A2 of the neural network. Computer-executable instructions may include, for example, instructions and data accessible by and causing a general purpose computer, special purpose computer, or special purpose processing device (e.g., one or more processors) to perform one or more functions or operations. For example, the computer-executable instructions may include those instructions for implementing all or only some of the tasks or functions or processes to be performed by a client computing device 10 or the server computing device 20 as described with reference to FIG. 1, 2, 3, 4, 5 or 6. And such instructions may be executed by one or more processor 993. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement the methods described with reference to FIGS. 1, 3, 4, 5 and/or 6 and 19 and defined in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and operations discussed herein.

The display unit 995 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

Methods embodying the present invention may be carried out on a computing device such as that illustrated in FIG. 9. Such a computing device need not have every component illustrated in FIG. 9, and may be composed of a subset of those components. A method embodying the present invention may be carried out by a single computing device in communication with one or more data storage servers via a network. The computing device may be a data storage itself storing at least a portion of the data.

A method embodying the present invention may be carried out by a plurality of computing devices operating in cooperation with one another. One or more of the plurality of computing devices may be a data storage server storing at least a portion of the data.

The above-described embodiments of the present invention may advantageously be used independently of any other of the embodiments or in any feasible combination with one or more others of the embodiments.

The following list of definitions describes the meaning of some technical terms in the context of this invention proposal:

Machine Learning: the subfield of computer science that "gives computers the ability to learn without being explicitly programmed". It explores the study and construction of algorithms that can learn from and make predictions on data.

Deep Learning: is a part of a broader family of machine learning methods based on learning data representations, as opposed to task-specific algorithms.

Artificial Neural Network/Neural Network (ANN/NN) is an information processing paradigm that is inspired by the way a biological nervous system, such as the brain, processes information. They can be used to extract patterns and detect trends that are too complex to be noticed by either humans or other computer techniques.

Named Entity Recognition (NER): Named Entity Recognition (NER) approaches identify and extract references to entities in unstructured texts. These entities are units like names (including persons, organizations and locations), numeric expressions (including time, date, money and percent expressions).

Decentralized systems: a system in which lower level components operate on local information to accomplish global goals. This form of control is known as distributed control, or control in which each component of the system is equally responsible for contributing to the global, complex behaviour by acting on local information in the appropriate manner.

Distributed Architectures: is an environment where its components are presented on different platforms and several components can cooperate with one another over a communication network in order to achieve a specific objective or goal.

f-score: is a conventional measure of a model's accuracy on a dataset.

The invention claimed is:

1. A method of training a neural network as a natural language processing, NLP, model, the method comprising:

inputting respective sets of annotated training data to a plurality of first architecture portions of the neural network, which first architecture portions are executed in respective client computing devices of a plurality of distributed client computing devices in communication with a server computing device, wherein each set of training data is derived from a set of text data which is private to the client computing device in which the first architecture portion is executed, the server computing device having no access to any of the private text data sets, and all sets of training data share a common encoding;

deriving from the sets of annotated training data, using the first architecture portions, respective weight matrices of numeric weights which are decoupled from the private text data sets;

concatenating, in a second architecture portion of the neural network which is executed in the server computing device, the weight matrices received from the client computing devices to obtain a single concatenated weight matrix; and training, on the second architecture portion, the NLP model using the concatenated weight matrix;

wherein the sets of training data in the common encoding are derived by pre-processing private sets of text data in respective client computing devices by:

carrying out on the set of text data in each client computing device a vocabulary codification process to ensure a common vocabulary codification amongst all the training data to be provided by the client computing devices, wherein in the vocabulary codification process a common alphanumeric character-level representation is established for the vocabulary that uses characters decided by the server computing device, and using the predefined common character-level representations and predefined common setting parameters, carrying out in each client computing device a word embedding process in which the text data is mapped to vectors of real numbers.

2. Apparatus for training a neural network as a natural language processing, NLP, model, the apparatus comprising:

a plurality of distributed client computing devices to execute respectively a plurality of first architecture portions of the neural network, wherein each first architecture portion receives a set of annotated training data derived from a set of text data which is private to the client computing device in which the first architecture portion is executed, all sets of training data sharing a common encoding; and a server computing device in communication with each of the client computing devices of the plurality, the server computing device to execute a second architecture portion of the neural network, the server computing device having no access to any of the private text data sets;

wherein:

the first architecture portions derive, from the sets of annotated training data, respective weight matrices of numeric weights which are decoupled from the private text data sets, and the weight matrices received from the client computing devices are concatenated in the second architecture portion to obtain a single concatenated weight matrix, the NLP model being trained on the second architecture portion using the concatenated weight matrix; and wherein the client computing devices are operable to derive respective sets of training data in the common encoding by pre-processing respective private sets of text data by:

carrying out on the set of text data in each client computing device a vocabulary codification process to ensure a common vocabulary codification amongst all the training data to be provided by the client computing devices, wherein in the vocabulary codification process a common alphanumeric character-level representation is established for the vocabulary that uses characters decided by the server computing device, and using the predefined common character-level representations and predefined common setting parameters, carrying out in each client computing device a word embedding process in which the text data is mapped to vectors of real numbers.

\* \* \* \* \*